June 14, 1932.  F. J. OVEN  1,862,703

GASKET

Filed Feb. 16, 1931

Inventor:
Frank J. Oven
By Wm. O. Bell, atty.

Patented June 14, 1932

1,862,703

UNITED STATES PATENT OFFICE

FRANK J. OVEN, OF CHICAGO, ILLINOIS, ASSIGNOR TO VICTOR MANUFACTURING & GASKET COMPANY, OF CHICAGO, ILLINOIS, A CORPORATION OF ILLINOIS

GASKET

Application filed February 16, 1931. Serial No. 515,904.

This invention relates to gaskets and has particular reference to means forming part of the gasket for centering the gasket on its seat and retaining it in centered position.

The invention is especially adapted for use in connection with threaded caps or bungs or other closures in which the threaded flange is undercut at its inner end adjacent the seat. It is necessary that the inside diameter of the gasket shall be sufficient to clear the outside diameter of the threaded flange in order that the gasket may be arranged in place for sealing the joint between the cap and the tank and hence the inside diameter of the gasket will be appreciably greater than the diameter of the undercut part of the threaded flange, with the result that the gasket has as much play on the cap as these differences in diameter permit and this play makes it extremely difficult and, for all practical purposes, impossible to ensure proper registration of the gasket on its seat in the frequent use of the cap.

The primary object of my invention is to provide a simple means for centering and retaining a gasket on its seat about a part of less diameter than the inner diameter of the gasket so that it will constantly be maintained in proper registration with the seat for making an effective and tight joint.

Another object of the invention is to provide a simple means for retaining the gasket on the cap so that it will not fall off or become dislodged from seating position when the cap is removed from the tank.

I have illustrated the invention in the accompanying drawing in a cap for a tank and referring thereto Fig. 1 is a sectional view showing the gasket as first applied to the cap and free thereon.

Figure 1:
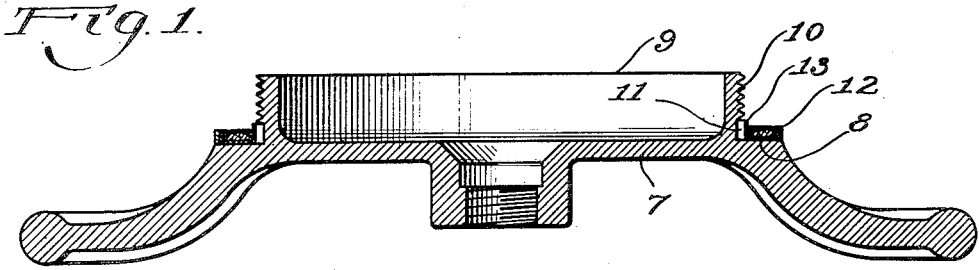
Figure 2:
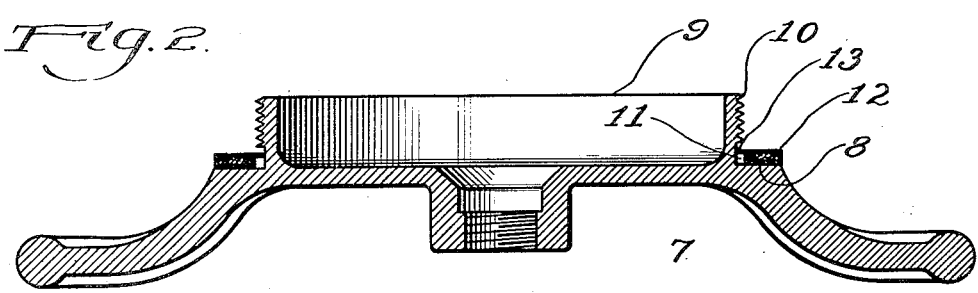
Fig. 2 shows the gasket centered and retained in position on the cap.
Figure 3:
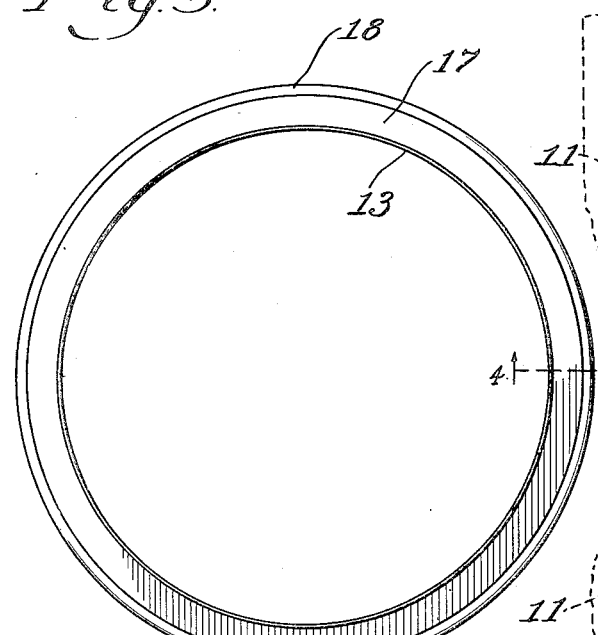
Fig. 3 is a plan view of the gasket before it is used.
Figure 4:
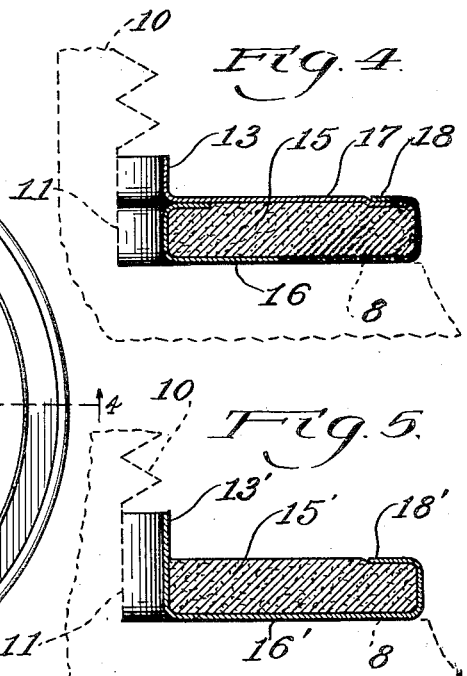
Fig. 4 is an enlarged sectional view on the line 4—4 of Fig. 3.
Figure 5:
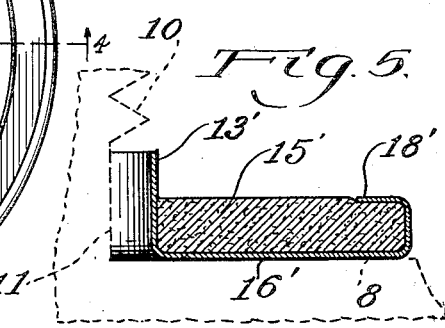
Fig. 5 is a similar view showing another form of the invention.
Figure 6:
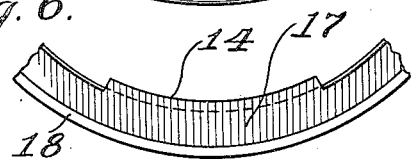
Fig. 6 is a detail view showing another form of the invention.

I have selected this form of cap because it illustrates an important commercial use of the invention but it will be understood that the invention is not limited to a cap or other particular closure because it can be embodied in many different kinds of closures for which it is or may be adapted. The cap 7 has a seat 8 and an annular flange 9 at the inner edge of the seat, the flange having an outer thread 10 which terminates apart from the seat providing an undercut recess 11 at the inner end of the flange between the seat and the thread. The gasket 12 has an inside diameter large enough to permit the gasket to pass over the threaded part of the flange to the seat 8 and in this position it will be free to move laterally to the extent permitted by the recess 11. To prevent this movement of the gasket on its seat I provide the gasket with an upturned flange 13 at its inner edge. This flange assists in guiding the gasket over the thread to its seat, Fig. 1, and then it can be bent down to an inwardly directed position, Fig. 2, in which it serves to center the gasket on its seat and to retain the gasket in place on the flange because the inside diameter of the flange 13 when turned down to inwardly directed position is less than the outside diameter of the thread. It is preferred to make the retaining flange 13 of a width which will bridge the recess 11 between the body of the gasket and the threaded flange and engage the threaded flange in the undercut recessed part thereof beyond the thread. Instead of making the flange 13 continuous, Fig. 3, I may provide the gasket with a plurality of spaced flanges 14, Fig. 6. The gasket may be made of suitable gasket material 15 having a metal layer 16 applied to its bottom and folded over its inner and outer edges, and an upper metal layer 17 which covers the top of the gasket and is engaged beneath the outer marginal edge 18 of the lower layer and has the upturned flange 13 at its inner marginal edge. Or the upper metal layer may be omitted, Fig. 5, and the flange 13' may be formed by the inner marginal edge of the lower metal layer 16'. The particular form, construction or material of the gasket may be changed as found desirable to satisfy different conditions.

In practice the gasket is passed over the threaded part of the cap flange to its seat on the cap and then the retaining flange 13 is pressed down to retaining position by running a tool around the flange beneath the thread. The metal layer of which the retaining flange is formed is made of thin sheet copper or other suitable metal and it can be very easily turned down to retaining position by the use of any small tool, or a nail or stout stick or other substitute. The width of the retaining flange may be varied if desired but for general purposes I prefer that it should be made to engage the undercut part of the cap flange and center the gasket in proper position on its seat; but the flange will retain the gasket on its seat if its inside diameter is only slightly less than the outside diameter of the thread and such flange will center the gasket on the seat better than if the gasket were not provided with the retaining flange. The retaining flange may also be made of a width which will center the gasket on its seat farther removed from the threaded flange than is now customary and in all cases the gasket will be retained upon the cap against detachment therefrom when the cap is removed from the tank.

The invention is simple in character and involves only a slight addition to the gasket; the flange assists in guiding the gasket over the thread of the cap flange to its seat and it can be readily turned down to retaining position without requiring special skill or a particular tool. The gasket may be applied to the cap when the cap is made or it can be assembled with the cap at any time thereafter and can be replaced while the cap is in use as often as may be required.

I have shown the invention in selected embodiments which are sufficient to illustrate the construction and the manner of use thereof but I do not limit the invention to this particular disclosure but consider myself entitled to make any changes in the form, construction and adaptation of the invention as may be necessary or desirable to adapt it for different gaskets and for different uses within the scope of the following claims.

I claim:

1. The combination with an annular flange and a gasket seat about the flange, said flange having a thread thereon and an undercut recess between the seat and the thread, of a gasket comprising a body of a diameter sufficient to clear the thread when the gasket is being arranged in place on said seat, and retainer means projecting from the body of the gasket and adapted to be engaged in said recess to center the gasket on its seat.

2. The combination with an annular flange and a gasket seat about the flange, said flange having a thread thereon and an undercut recess between the seat and the thread, of a gasket comprising a body of a diameter sufficient to clear the thread when the gasket is being arranged in place on said seat, and bendable retainer means on the gasket adapted to be engaged with said recess when the gasket is seated to center the gasket on its seat.

3. The combination with an annular flange and a gasket seat about the flange, said flange having an undercut recess, of a gasket having an upstanding flange to clear said annular flange and permit the gasket to be arranged on its seat, said upstanding flange adapted to be bent into said undercut recess to retain the gasket on said annular flange and center the gasket on its seat.

4. A gasket comprising a layer of gasket material, a bottom metal layer folded over the inner and outer edges of the gasket material, and a top metal layer having one edge engaged with a folded edge of the bottom layer and its other edge provided with an upstanding flange adapted to be bent downwardly to form a means for centering and retaining the gasket on its seat.

5. A gasket comprising a layer of gasket material, a bottom metal layer secured to said layer of gasket material at its outer edge and having an upstanding flange at its inner edge extending above the layer of gasket material and adapted to be bent downwardly and inwardly of the gasket to center and retain the gasket on its seat.

FRANK J. OVEN.